June 7, 1927.
R. W. SMITH
1,631,435
SHUTTER CONTROL FOR CAMERAS
Filed April 19, 1921
2 Sheets-Sheet 1
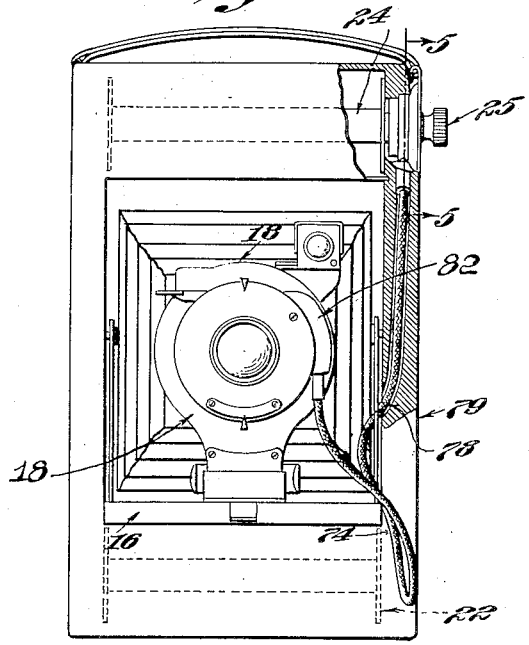
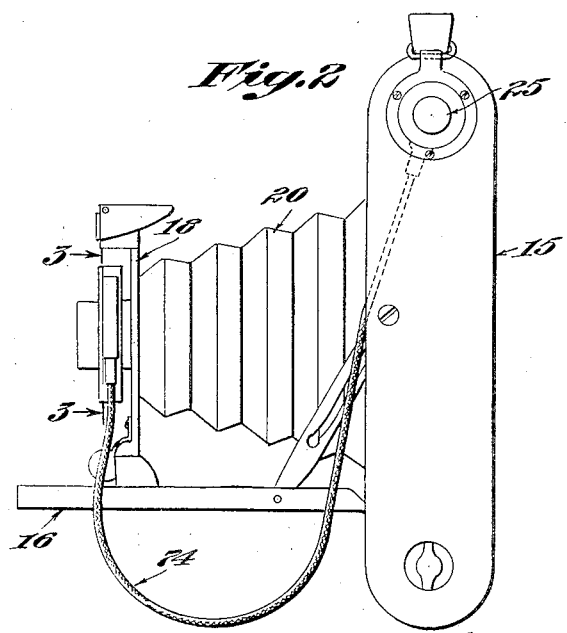

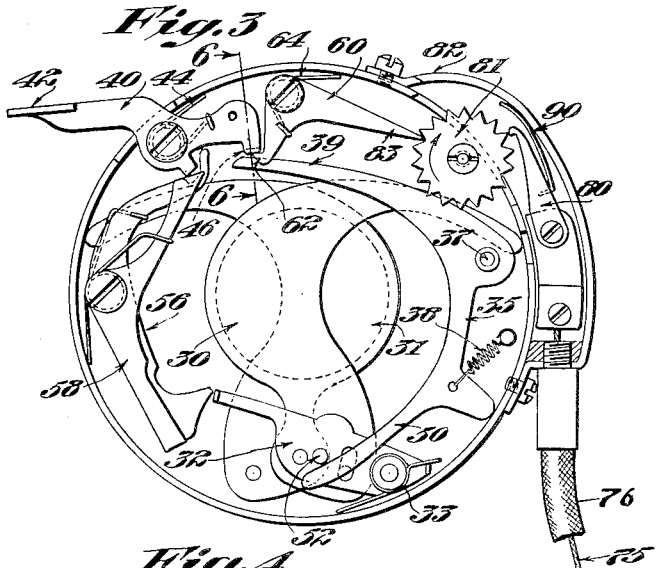
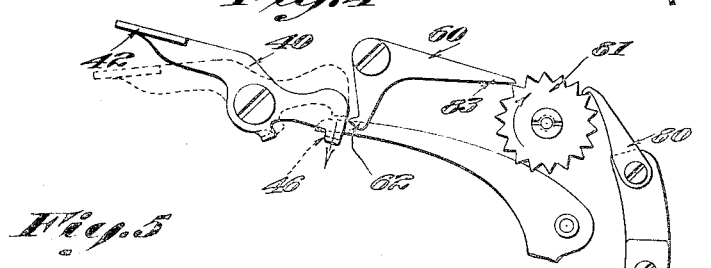
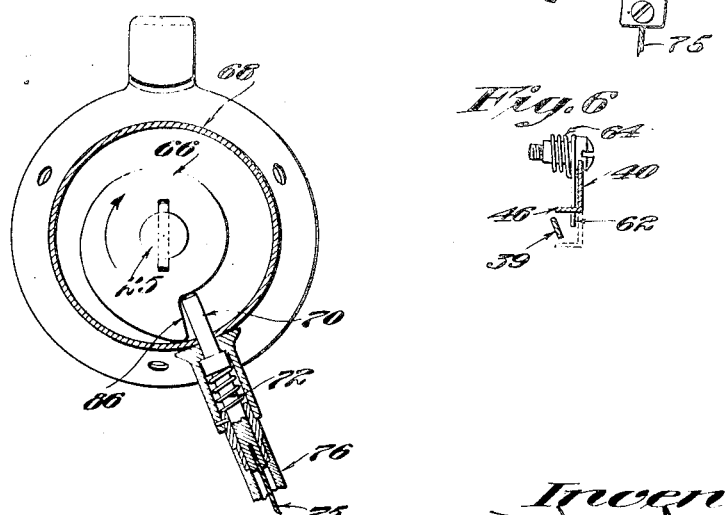

Patented June 7, 1927.

1,631,435

UNITED STATES PATENT OFFICE.

RICHMOND W. SMITH, OF WALPOLE, MASSACHUSETTS.

SHUTTER CONTROL FOR CAMERAS.

Application filed April 19, 1921. Serial No. 462,546.

The present invention relates to improvements in cameras and more particularly to certain improvements in cameras designed for the prevention of a double exposure.

It is well recognized that the embodiment of some form of apparatus in a camera which shall insure against the possibility of making two successive exposures without changing the film or plate in the interim is highly desirable. With this idea in view a variety of schemes have been proposed, but owing to their complication and their failure to function properly none of these schemes have gone into successful use.

It is the object of the present invention to provide a simple, efficient and compact mechanism which may easily be added to the present types of cameras and which prevents the operator from making more than one exposure upon the same film or plate.

The preferred form of the invention is embodied in a camera of the roll film type in which the exposed film is replaced by a new film through the advance of a film strip wound at its opposite ends upon carrier spools.

An important feature of the present invention resides in the provision of releasing mechanism actuated by the turning movement of the film spool to advance a new film surface into position and designed through suitable connections to release the shutter operating lever which has been previously locked in an inoperative position after the exposure.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents a front elevation partly in section of a folding camera embodying the new construction; Fig. 2 is a side elevation of the camera shown in Fig. 1; Fig. 3 is a detail illustrating an enlarged plan view of the shutter mechanism together with the new form of control embodied therein; Fig. 4 is a detail illustrating an enlarged view of certain parts of the shutter locking mechanism removed from the shutter as a whole; Fig. 5 is a section on line 5—5 of Fig. 1 illustrating a view of the actuator mechanism connected with the winding spool for releasing the shutter when the spool is operated; and Fig. 6 is a section upon the line 6—6 of Fig. 3 and illustrates a portion of the shutter operating lever and the cooperating shutter member.

Referring to the illustrated embodiment of the invention it will be observed that the camera shown therein is of the folding type embodying a flat case 15 having a hinged drop portion 16 provided with the usual tracks over which the lens board 18 is moved, the lens board being connected with the case of the camera through light-proof bellows 20. The opposite ends of the case 15 receive film spools which are indicated at 22 and 24 respectively. These film spools are usual in film cameras, the spool 22 being inserted within the camera case with a new film wound thereon, the end of which is engaged with the spool 24 which is connected with a winding knob 25 in such a manner that it is turned thereby. According to the present invention, mechanism is connected with one of the film spools to release the shutter upon turning the spool to advance a new film surface into position, the shutter having been automatically locked in an inoperative position during the previous exposure. Operating in conjunction with the shutter release is a locking device which operates automatically to hold the shutter lever in an inoperative position after each actuation of the lever to make an exposure.

The shutter mechanism illustrated in Fig. 3 of the drawings is of a well known type in which the present control is conveniently embodied. As shown, the shutter comprises two pivoted segments 30 and 31 which are operated directly by an arm 32 normally returned to the position shown in Fig. 3 by a spring 33. This arm is depressed to separate the sectors and open the shutter by an operating lever 35 which is pivoted at 37 and normally returned to the position shown in Fig. 3 by a spring 38. The upper end 39 of the operating lever is bent into an inclined position, as shown in section in Fig. 6, and is positioned in the path of the pivoted control lever 40, having an operating portion 42 projecting outwardly through the casing into position to be engaged by the operator. This control lever is normally moved into the position shown in Fig. 4 with the inner end depressed, by a spring 44. In this position with the inner end of the control lever located as shown the inturned end 46 is positioned beneath the end 39 of the lever 35 in such a manner that with an upward movement, due to a pressure upon the outer end, it turns the operating lever 35 about its pivot and swings the lower end 50 of the operating lever inwardly and upwardly, tensing the spring 38. When the inner end of the control lever reaches approximately the limit of its upward movement, the operating lever 35 is automatically disengaged therefrom and suddenly snaps back into the position shown under the action of the spring 38. During this return movement the end 50 of the lever engages with a projecting stud 52 upon the arm 32 and snaps the arm down to open the shutter. If a time or bulb exposure is desired the movements of the arm 32 and the control lever 40 are put under the control of two pivoted levers 56 and 58 respectively, which serve to cause the actuation of the control lever to operate the shutter accordingly. As will be obvious to those skilled in the art, when operating this type of shutter for an instantaneous exposure the control lever is turned from the position shown in full lines in Fig. 4 into approximately the position shown in dotted lines in Fig. 4. This causes the shutter to be opened and closed through the mechanism previously described. Thereafter when the control lever is released it will return to the "reset" position shown in Fig. 4 with the inturned lower end 46 positioned beneath the projecting portion 39. When operating with the mechanism set for a bulb exposure the movement of the control lever from the position shown in full lines in Fig. 4 to the position shown in dotted lines opens the shutter. Thereafter the shutter is retained in this position until the lever is released, this causing the shutter to close. In operating the mechanism when set for a time exposure the movement of the lever from the "reset" position shown in full lines in Fig. 4 to the position shown in dotted lines opens the shutter. Thereafter when the lever is released it returns to a second "reset" position substantially midway between the two positions shown in Fig. 4 in such a manner that a second actuation of the control lever closes the shutter.

With the present mechanism, after the control lever has been moved from the "reset" position to open the shutter it is automatically prevented from returning to the "reset" position shown in full lines until the film spool has been turned to advance a new film into position for an exposure. The lock which prevents the return of the control lever into the initial position does, however, permit a second actuation of the lever to close the shutter in case the mechanism is set for a time exposure. The operation of the locking mechanism will be evident from an inspection of Figs. 3 and 4 which illustrate a pivoted locking dog 60 having a nose 62 which is adapted to engage beneath the inturned end 46 of the control lever and prevent the control lever from returning to the "reset" position shown in Fig. 4. The locking dog is normally moved into the locking position shown in Fig. 3 by a spring 64. When in locking position it will be evident that the dog 60 does not prevent any movement of the control lever 40 but limits the movement of the control lever in such a manner as to prevent these movements from being effective in operating the shutter except to accomplish the closing of a previously opened shutter when a time exposure has been made.

The automatic release of the shutter lock, as stated previously, is accomplished through the turning of the winding spool to advance a new film surface into position for exposure. To this end the stem of the winding knob 25 is provided with an actuating cam 66 enclosed within the housing 68, as will be obvious, and turned with the winding spool to advance the film. This winding movement turns the cam in the direction of the arrow, as shown in Fig. 5, and moves a plunger 70 against a spring 72, this plunger being conveniently connected with the shutter release on the lens board through a flexible operating connection indicated generally at 74 and comprising a cable 75 enclosed within a flexible sheath 76. This flexible connection, as indicated in Figs. 1 and 2, may lie in a groove 78 formed in one side 79 of the camera case. The opposite end of the cable 75 is connected with a sliding pawl 80 mounted within the shutter housing 82, as shown in Fig. 3. The pawl 80 engages with a ratchet wheel 81 which is also engaged by the end 83 of the locking dog 60 in such a manner that a slight movement of the ratchet wheel in the direction of the arrow tilts the locking dog sufficiently to release the control lever and permit its movement to a "reset" position, as shown in Fig. 4. The downward movement of the pawl 80 in a direction to release the locking dog takes place when the plunger 70 reaches the abrupt drop 86 on the cam 66, at this point the spring 72 snapping the pawl lengthwise and rotating the ratchet wheel sufficiently to release the locking dog. The pawl 80 is normally retained in engagement with the ratchet wheel through a leaf-spring 90 which bears against the inner face of the housing 82 at its free end, this housing being so shaped that the pawl is freed from the ratchet at the end of its movement, permitting the ratchet to be turned slightly in a reverse direction under the action of the spring 64 acting through the dog 60.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:

1. A camera comprising a shutter control lever, a shutter mechanism cooperating therewith and adapted to open the shutter upon movement of the control lever from its initial position, a pivoted locking dog adapted to engage the control lever to prevent the return of the lever to initial position, a ratchet wheel engaging the locking dog, and means for turning the ratchet wheel upon movement of the film spool for releasing the locking dog to permit return of the control lever.

2. A camera comprising a shutter control lever, a shutter mechanism adapted to open the shutter upon movement of the control lever from its initial position, a locking dog normally arranged in position to engage the control lever for preventing return thereof after an exposure, film spool turning means, and connections betwen the film spool turning means and the locking dog for momentarily releasing the locking dog during the rotation of the film spool.

3. A camera comprising a shutter control lever, a shutter mechanism adapted to operate the shutter upon movement of the control lever from its initial position, locking means normally arranged to prevent return of the control lever to reset position after an exposure, film spool turning means, a cam on the film spool turning means having an abrupt drop, and connections between the cam and the locking means arranged to momentarily release the locking means upon the engagement of said connections by the abrupt drop portion of the cam.

4. A camera having, in combination, a film spool, a shutter control lever, a locking dog adapted to obstruct the path of the control lever after a single operating movement, means for releasing the locking dog upon movement of the film spool including a ratchet wheel engaging one end of the dog, and a pawl adapted to rotate the ratchet wheel.

5. A camera comprising a film spool, a cam rotatable with the spool, a manually operable shutter control lever, a locking dog adapted to prevent the return of the shutter control lever to its original position, a ratchet wheel for releasing the locking dog from engagement with the control lever, and a pawl actuated by the cam for rotating the ratchet wheel.

6. A camera comprising a shutter control lever, locking means arranged normally to prevent return of the control lever to re-set position after an exposure, a ratchet associated with the locking means, a pawl for advancing the ratchet, film spool turning means, and connections between the film spool turning means and the pawl for momentarily advancing the ratchet to release the locking means, and means acting on the pawl for permitting the locking means to return to its normal position.

7. A camera comprising a shutter control lever, a locking dog normally in position to prevent return of the shutter control lever after an exposure, a ratchet engaging with the locking dog, a pawl for advancing the ratchet, film spool turning means, a cam associated with the film spool turning means having a portion of gradually increasing diameter and an abrupt drop portion, a plunger adapted to be operated by the cam, connections between the plunger and the pawl for actuating the pawl without rotation of the ratchet upon engagement of the gradually increasing portion of the cam and to permit a sudden momentary movement of the ratchet during the passage of the plunger over the abrupt drop portion of the cam, and means for releasing the pawl from the ratchet to permit the locking dog to move into normal position after release of the control lever.

RICHMOND W. SMITH.